United States Patent [19]

Morello

[11] 3,716,514

[45] Feb. 13, 1973

[54] POLYAMIDE-IMIDE COMPOSITIONS CONTAINING GUANIDINE SALTS OF WEAK ACIDS AS BONDING AGENTS

[75] Inventor: Edwin F. Morello, Whiting, Ind.

[73] Assignee: Standard Oil Company, Chicago, Ill.

[22] Filed: March 1, 1971

[21] Appl. No.: 119,874

[52] U.S. Cl...........................260/33.4 P, 260/78 TF
[51] Int. Cl. .............................................C08g 51/34
[58] Field of Search..........260/78 TF, 33.4 P, 32.6 N

[56] References Cited

UNITED STATES PATENTS

| | | | |
|---|---|---|---|
| 3,513,134 | 4/1970 | Filius | 260/78 |
| 3,355,427 | 11/1967 | Loncrini | 260/47 |
| 3,347,828 | 10/1967 | Stephens | 260/47 |
| 3,260,691 | 7/1966 | Lavin | 260/30 Z |

Primary Examiner—Morris Liebman
Assistant Examiner—Richard Zaitlen
Attorney—Arthur G. Gilkes, William T. McClain and Gunar J. Blumberg

[57] ABSTRACT

The adhesion of an amide-imide polymeric coating on a magnet wire is substantially improved by the addition of guanidine or guanidine salts of weak acids in the initial coating composition.

3 Claims, No Drawings

POLYAMIDE-IMIDE COMPOSITIONS CONTAINING GUANIDINE SALTS OF WEAK ACIDS AS BONDING AGENTS

This invention relates to aromatic polytrimellitamide-imide polymers and their use in producing insulation on wire and other surfaces and more particularly relates to the use of guanidine or guanidine salts of weak acids as bonding additives in an amide-imide magnet wire coating composition.

The polymers may be described as polyamides having some polyimide linkages; said polyamides are capable, when heated, of conversion to the polyamide-imide form. Such polyamides are high molecular weight polymeric compounds having in their molecules units of

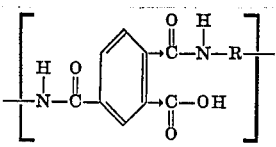

wherein → denotes isomerism and wherein R is a divalent aromatic organic radical. This organic radical consists of R', which is a divalent aromatic hydrocarbon radical or two R' divalent aromatic hydrocarbon radicals joined by stable linkages —O—, —CH$_2$—,

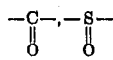

and —S—, as are in the groups —R'—O—R'—, —R'—CH$_2$—R'—,

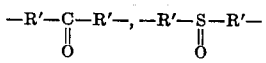

—R'—SO$_2$—R'— and R'—S—R'—. The molecular weight of these polyamides is sufficiently high to produce upon heating a film-forming polymer. Said amides are susceptible to condensation by heating to a polyamide-imide having to a substantial extent recurring units of

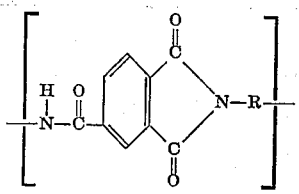

wherein R is a divalent aromatic organic radical in which in addition to hydrogen, nitrogen, sulfur and oxygen atoms can be attached to the carbon atoms. This organic radical consists of R', which is a divalent aromatic hydrocarbon radical or two R' divalent aromatic hydrocarbon radicals joined by stable linkages —O—, —CH$_2$—,

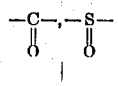

—SO$_2$—, as are in the groups —R'—O—R'—, —R'—CH$_2$—R'—,

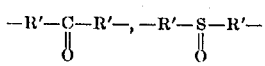

—R'—SO$_2$—R'— and R'—S—R'.

It has been found that the aforementioned polyamide-imide polymers in cresol or phenol solvent separate from the wire and can, in effect, be removed intact from the underlying substrate when the wire is subjected to conventional tests for adhesion. This has been a serious drawback in the utilization of these inexpensive solvents in the amideimide wire enamel field. When the aforementioned polymers are prepared by reacting the acyl halide derivative of trimellitic anhydride and an aromatic diamine in the presence of solvent, particularly ortho, meta or para cresol, the resulting wire enamel solution when coated on a wire should be amenable to ordinary winding and normal abuse when placed on a wire. This means that the polymer insulation should remain intact when the wire is subjected to a full snap. The wire should be capable of being drawn rapidly to its breaking point (about 40 percent elongation for 18 AWG) and have the insulation not separate from the substrate. Unexpectedly it has been discovered that when about 0.1 to about 2 percent guanidine or guanidine salts of weak acids are added to these wire enamel solutions, the coated wire adheres to the substrate and renders the resulting coated wire useful in electric motors and related applications.

Besides guanidine the guanidine salts of weak acids useful in this invention as bonding additives are guanidine carbonate, guanidine thiocyanate and guanidine acetate.

The film flexiblity and adherence test methods of ASTM D 1676, 20 percent Jerk and jerk to break or SNAP are the best indications of improved adhesion and performance with these additives. This is illustrated in Table II. In Table II, Control No. 1, a cresylic type enamel has no adhesion, as measured by utilizing the aforementioned ASTM test methods. However, with guanidine carbonate in Table II, the adhesion was comparable to the commercial bonding agent dicyandiamide, Control No. 2.

The polyamide-imides are suitably prepared by reacting an acyl derivative of the benzene tricarboxylic acid anhydride and an aromatic diamine in the presence of organic solvent such as alkyl substituted phenols, commercial ortho, meta or para cresol, N,N-methylformamide, N,N-dimethylacetamide, N-methylpyrrolidone, dimethyl sulfoxide and the like. The reaction is suitably carried out at a temperature of about 0° to 70°C. The structure of the amine also affects the rate of reaction. The preferred primary aromatic diamines are p,p'-methylenebis(aniline), p,p'-oxybis(aniline) and p,p'-amino phenylsulfone. The preferred solvents are phenol, o—, p—, m—cresols, xylenols, either singly or as mixtures thereof commonly known are cresylic acids. The usual solvent identified as cresylic acid 9PX contains about 48–55 percent phenol, 15–33 percent ortho, meta and para-cresol and 9–19 percent xylenols and about 5 percent other C9 substituted phenols. The phenol or alkyl substituted phenols may be diluted up to about 30 percent with aromatic hydrocarbons. The preferred hydrocarbons are xylene, toluene and commercial aromatic hydrocarbon fractions. The reactants are preferably present in essentially an equimolar ratio. Variations with limits of plus or minus 3 mole percent of either starting material will usually have only minor affects on product property. Variations as high as plus or minus 10 mole percent may be suitable for less demanding applications than wire coating enamel from the standpoint of high flexural requirements. In a variation of this procedure after the polymer has formed water is added in about 1 to 5 weight percent, and is suitably allowed to digest for a few hours. Alkaline oxide is then added using from about 0 to 10 percent excess of that determined to neutralize the theoretical amount of hydrogen chloride produced. The amount of alkaline oxide added is calculated from the acid factor value. The polymers as formed have an amide content which varies from 55 to 100 percent and the imide content is from 0 to 45 percent. The polyamide-imide after heat curing theoretically contains 50 percent amide linkages and 50 percent imide linkages.

The first type of polymers produced may be defined as those soluble in organic solvents and capable of further reaction upon application of heat. They may be employed in solution, in high solids suspensions, or as powders in the production of coatings, laminates, films, fibers, molded products and as impregnating varnishes. The second type of polymers--the polyamide-imides-- are much less soluble than the amides and when they have been heat cured they are generally insoluble in organic solvents and may be regarded as cured end-product in the way of coatings, laminates, films, enamel-wire coatings and the like. The latter are characterized by resistance to solvents, by high thermal stability and good electrical characteristics.

The acyl halide derivatives are reacted in the phenol or alkyl substituted phenols solvent with an aromatic diamine having one or more aromatic rings and two primary amino groups. These aromatic diamines have the formula

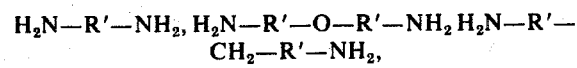

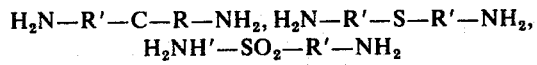

and $H_2N-R'-S'-R'-NH_2$ wherein R' is a divalent aromatic hydrocarbon radical hereinbefore indicated. The aromatic content of the diamine provides the thermal properties in the polymer while the primary amino groups permit the desired imide rings and the amide linkages to be formed in the polymer. Generally the aromatic diamine has from one to about four aromatic rings, advantageously from one to about two aromatic rings. The aromatic diamines having more than one aromatic ring may be further characterized as polycyclic aromatic compounds having two primary aromatic rings which may be interconnected by condensation, as in naphthalene or phenanthrene type structures, or may be bridged, either directly as in diphenyl diamines, or indirectly as, for example, two R' groups joined with unreactive stable linkages such as oxy, alkyl, carbonyl, sulfonyl and other relatively inactive groups such as sulfide group, as hereinbefore described. The alkyl group may be illustrated by methylene, ethylene, substituted derivatives such as dimethylmethylene, and the like. Suitable nuclei, the R' divalent aromatic hydrocarbon radical, include phenylene, naphthylene, anthrylene, naphthacenylene and the like; diphenylene, terephenylene, phenylnaphthalene, quaterphenylene and the like; and aromatic rings separated by oxy, alkyl, carbonyl, sulfonyl and thio groups. Advantageously the linkages between the aromatic groups are oxy or methylene and the amino groups are in the meta or para position on the aromatic nucleus.

The polyamide polymers have molecular weights above about 5,000 and the polyamide-imide polymers have molecular weight in excess of about 9,000. The defined polyamide of the first reaction as described hereinabove is soluble in organic solvents. Using the aromatic carbocyclic alcohols as solvents, solutions containing about 12 to about 30 percent solids by weight are obtainable. For applications requiring use of solutions for producing wire coatings, impregnating varnishes and the like, solutions of about 15 to about 28 weight percent and advantageously about 20 percent are desired. Such concentrations provide solutions with a good balance between solids content and solution viscosity for ease of handling in most practical applications. The viscosities for such solutions are in the range of about 3 to about 150 poises. For example, the viscosity of phenol-cresol solutions having about 17 percent solids is about 30 poises at a temperature of 25°C. Using guanidine or the guanidine salts of weak acids in the initial coating renders these solutions useful as wire enamels in that the polymer is capable of adhering to the wire or substrate when subjected to conventional tests.

These polyamide-imides can also be prepared by reacting trimellitic acid anhydride with diisocyanates in one of the aforementioned solvents at a temperature of about 220° to 350 °F. The monomeric diisocyanates are reacted with trimellitic acid anhydride. The following are examples of useful diisocyanates: aliphatic diisocyanates such as butane-, hexane- and heptane diisocyanate, aliphatic diisocyanates with a built in ring system such as w,w'-diisocyanate-1,3-dimethylbenzene, w,w'-diisocyanate-1,4-dimethylcyclohexane, w,w'diisocyanate-1,4diethylbenzene and cyclohexane-1,3,-cyclohexane-1,4-,1-methylcyclohexane-2,4- and dicyclohexylethane 4,4'-diisocyanates. In addition, there may be mentioned mixed aromatic aliphatic and aromatic hydroaromatic diisocyanates, such as 4-phenylisocyanate-methylisocyanate, tetrahydronaphthylene-1,5, hexahydrobenzidine-4,4'- and hexahydrodiphenylmethane-4,4'-diisocyanates, also diisocyanates of benzene and its homologues; for example, 1,3-phenylene-, 1,4-phenylene-, 1-methylene-benzene-2,4- and 1-methylbenzene-2,6-diisocyanate and mixtures of their isomers, mono-, di- and triisopropylbenzyl-diisocyanates, polyisocyanates of naphthalene of diphenyls and of di- and tri-phenylmethane with polynuclear ring systems or of polyphenyl compounds. Examples of the last mentioned classes of substances are naphthalene-1,4-, naphthalene-1,5, diphenyl-4,4'-, diphenylmethane-4,4' -, anthraquinone-2,6- and diphenylsulphide-2,4-diisocyanates, 4,4'-dimethyldiphenylmethane-2,2'-diisocyanates. The polyisocyanates used according to the invention may also be substituted by halogen-, alkoxy-, azo-, nitro-, cyano-, ester- or sulphonic groups. Examples of these are 1-chlorobenzene-, 1-nitrobenzene- and 1-methoxybenzene-2,4-diisocyanate and benzidine sulphonic-4,4'-diisocyanate. Polyarylpolyisocyanates are preferred. Advantageously, the isocyanato groups are in the meta or para position in the aromatic nucleus and particularly on separate rings when the nucleus has more than one aromatic ring. The preferred diisocyanates are 4,4 methylene bis phenyl-diisocyanate, 4,4 oxybis phenyl-diisocyanate, 1,4-phenyl diisocyanate, 1,3-phenyl diisocyanate, diphenylmethane 3,3'-diisocyanate, diphenylmethane 4,4'-diisocyanate, diphenylether 3,3'-diisocyanate, diphenylether 4,4'-diisocyanate, naphthalene diisocyanate, diphenyl 1,4'-diisocyanate, diphenyl 1,3-diisocyanate, diphenylketone-3,3'-diisocyanate, diphenylketone 4,4'-diisocyanate.

The invention is further illustrated by the following examples.

EXAMPLE I

In a nitrogen atmosphere 1.48 moles of the acid chloride of trimellitic anhydride is added to a 1.48 mole solution of methylenebisaniline in 2040 cc. (2150 g.) of cresylic acid solvent (9PX). Two hours is required for addition and cooling is needed to maintain the temperature at 50°C. After addition is complete, heat is applied as needed and reaction temperature maintained at 50°C. for an additional 2 hours. Fifty-three grams of water is then added and the solution digested at 50°C. for 3 hours. The solution has a greenish haze at this point. The reaction mixture is cooled to ambient temperature and 90 grams (3.5 percent excess) of propylene oxide is slowly added. Stirring is continued and viscosity increases over several hours to a Brookfield level of 9.5 poises at 23.3°C.

Solutions for wire coating were prepared by diluting to a 17–18 percent polymer level and adding guanidine carbonate bonding agent to insure adhesion to copper wire. The solution was coated on copper wire on a vertical coating oven at 750°F. cure temperature and was tested for flexibility and adhesion according to ASTM D 1676. To be amenable to automatic winding and normal abuse the wire should take a full snap. This means it should be capable of being drawn rapidly to break and have the stretched portions of the coating on the wire remain integral, i.e., it should have no cracks (brittleness) or it should not "tube" which means poor adhesion, or the coating essentially separating from the substrate. In addition to SNAP it is desirable that the stretched portion of the snapped wire be wound about a mandrel as small as possible. The mandrels are 1, 2, 3, etc. times the wire diameter and are named 1X, 2X, 3X, etc. Hence, a rating terminology for flexural properties is Snap or Jerk-Smallest Passing Mandrel of SPM. A 20 percent Jerk-SPM of 1 is the top rating. More realistically on a commercially acceptable scale SPM of 2 is very good, 3 is good, 4 is acceptable and 5 is poor. Our sample passed a 2X mandrel at 20 percent SNAP and a full SNAP test on a 3X mandrel. Thus out sample scored very good (2) on the 20 percent Jerk-smallest Passing Mandrel test.

EXAMPLE II

To a 3 liter flask equipped with a stirrer, water separator and suitable vacuum air bleed, was added 270 gm. (1.36 moles) of methylene bisaniline (MBA) and 1842 gm. of commercial grade cresylic acid containing about 50 percent phenol, about 30 percent o,m,p-cresol and about 20 percent xylenols. With stirring a clear solution was obtained and 288 gm. (1.36 moles) of the 4-acid chloride of trimellitic anhydride was added in portions over a period of 1¼ hours. The temperature gradually increased and was held at 50°C. for an additional hour. A vacuum of 100 to 120 mm Hg. was applied and a slight air bleed of 7 cc./min. was employed. Temperature was then increased to 70°C. and held for one half hours, and was finally raised to 100°C. for an additional 2½ hours. An insoluble phase formed at 70°C. but redissolved after 1½ hours at 100°C. The clear solution was cooled to 25°C. and solution viscosity determined. A Gardner viscosity of 5.5 strokes was obtained.

Acid titer of the solution was determined by titration and a value of 0.198 milliequivalent per gram found. This corresponds to 31 percent of the theoretical amount of the hydrogen chloride generated. To 2263 gm. of the solution 27.3 gm. of propylene oxide was added a nd corresponds to a 5 percent theoretical hydrogen chloride. The propylene oxide was added dropwise over a one hour period and stirring continued overnight before viscosity determination. Gardner viscosity was 25 strokes at 25°C. at a 20.4 percent solids level.

EXAMPLES III–XIII

Wire enamel coatings were prepared as shown in Example II and the various additives added as shown in Table I and II. The data in Tables I and II demonstrates the superiority of the guanidine salts of weak acids as bonding additives.

Reverse Impact Test

A. Panel Preparation

Copper panels, 3 inches × 4 inches × 24 gauge, were cleaned by a quick dip in conc. hydrochloric acid and then rising in water. Polymer solutions containing 20 percent solids were then spread on the dried panels by means of a No. 24 wire wound rod or Bird applicator to give a uniform roughly 0.5 mil film. The panels were then heated in circulating hot air ovens for 30 min/300° F., 5 min/500°F., and then finally 3 min/600°F. Panels

TABLE I
Accelerated aging tests with guanidine bonding agents (cresylic type wire enamel)

| Example | Additive | Concentration, percent on solution | Aging time, 300° F. Zero | 24 hrs. | 114 hrs. | 162 hrs. | 200 hrs. | Comments |
|---|---|---|---|---|---|---|---|---|
| 3 | None | — | + | − | | | | |
| 4 | Dicyandiamine | 0.06 | + | − | | | | |
| 5 | Guanidine carbonate | 0.1 | + | + | + | − | | |
| 6 | Do | 0.3 | + | + | + | − | | |
| 7 | Do | 0.5 | + | + | + | + | + | Test teminated 200 hours. |
| 8 | Guanidine thiocyanate | 0.21 | + | + | + | + | + | 448 hrs.—O.K. test terminated. |

(+) pass or (−) fail impact-adhesion test.

were then placed in a 300°F. oven for thermal aging and were pulled at intervals for ambient reverse impact tests. A single panel can be used for several impact tests.

B. Impact Test Method

The panel was impacted by 160 inches lbs. on the uncoated side at room temperature in a Gardner Variable Impact Tester fitted with a ⅝ inch diameter punch. The impacted panel was then inspected for peeling, cracking or flaking to indicate test failure. The oven aging and impact testing was continued until a failure resulted. Time for failure was taken as a measure of impact resistance and film bond strength.

The wire enamel solutions were coated on a 24 foot vertical forced air wire enameling oven. Six coating passes were used to apply the proper insulation thickness. The wire thickness was 18 AWG. The coated magnet wire was tested according to ASTM D-1676 for film thickness, film flexibility and adherence, dielectric breakdown voltage and unidirectional scrape resistance. Short term thermal stability or burnout was determined by subjecting a twisted pair of wires to a current of 36 amps for 180 seconds, 30 amps for 180 seconds, etc. until the insulation lost its electrical insulation properties. The coating test results are reported in Table II.

I claim:

1. A magnet wire coating composition comprising (A) an amide-imide polymer, (B) a solvent system for said polymer selected from the group consisting of ortho cresol, meta cresol, para cresol, phenol and mixtures of the cresols and phenol, and (C) guanidine salts of weak acids as bonding additives wherein the amount of guanidine salts of weak acid added to varies from about 0.1 to about 2 percent by weight of the magnet wire coating composition.

2. A magnet wire coating composition comprising (A) an amide-imide polymer, (B) a solvent system for said polymer selected from the group consisting of ortho cresol, meta cresol, para cresol, phenol and mixtures of the cresols and phenol, and (C) guanidine carbonate as bonding additives wherein the amount of guanidine carbonate added varies from about 0.1 to about 2 percent by weight of the magnet wire coating composition.

3. A magnet wire coating composition comprising (A) an amide-imide polymer, (B) a solvent system for said polymer selected from the group consisting of ortho cresol, meta cresol, para cresol, phenol and mixtures of the cresols and phenol, and (C) guanidine thiocyanate as bonding additives wherein the amount of guanidine thiocyanate added varies from about 0.1 to about 2 percent by weight of the magnet wire coating composition.

TABLE II

Cresylic-type wire coating tests** — Guanidine carbonate additive

| Example | Additive level, percent | Solids, percent | Brookfield visc., poises | Cure*** temp., °F. | Elongation tests | | Burn-out, sec. | Dielectric, k.v.p.m. | Scrape test | Build, mils | Additive | Comments |
|---|---|---|---|---|---|---|---|---|---|---|---|---|
| | | | | | 20% jerk | SNAP | | | | | | |
| 9 | 0.5 | 16.7 | 30/25° C. | 700 | 2X | P | 362 | 4.62 | 1,107 | 1.7 | Guanidine carbonate. | |
| | | | | 750 | 3X | P | 584 | 4.09 | 1,017 | 1.7 | | |
| 10 | 0.3 | 16.5 | 30/25° C. | 700 | 3X | P | 257 | 4.53 | 1,062 | 1.7 | Dicyandiamide. | Control No. 2. |
| | | | | 750 | 3X | P | 432 | 3.92 | 1,035 | 1.8 | | |
| 11—Control | None | | | 700 | F | F | | | | | None | Control No. 1; no adhesion. |
| | | | | 750 | F | F | | | | | | |
| 12 | 1.0 | 16.8 | 30/25° C. | 700 | 2X | P | 117 | 5.06 | 1,125 | | Guanidine carbonate. | |
| | | | | 750 | 3X | P | 406 | 4.35 | 1,053 | | | |
| | | | | 790 | 3X | P | 506 | 4.02 | 1,026 | | | |
| | | | | 650 | 2X | P | | | 1,016 | 1.9 | | |
| 13 | 0.5 | 16.5 | 30/25° C. | 700 | 2X | P | 310 | 4.4 | 1,104 | | Guanidine thiocyanate. | |
| | | | | 750 | 4X | F | | | 1,144 | 2.0 | | |

Oven bottom zone, 540° F.   *Wire speed, 35 ft./min.

* * * * *